UNITED STATES PATENT OFFICE.

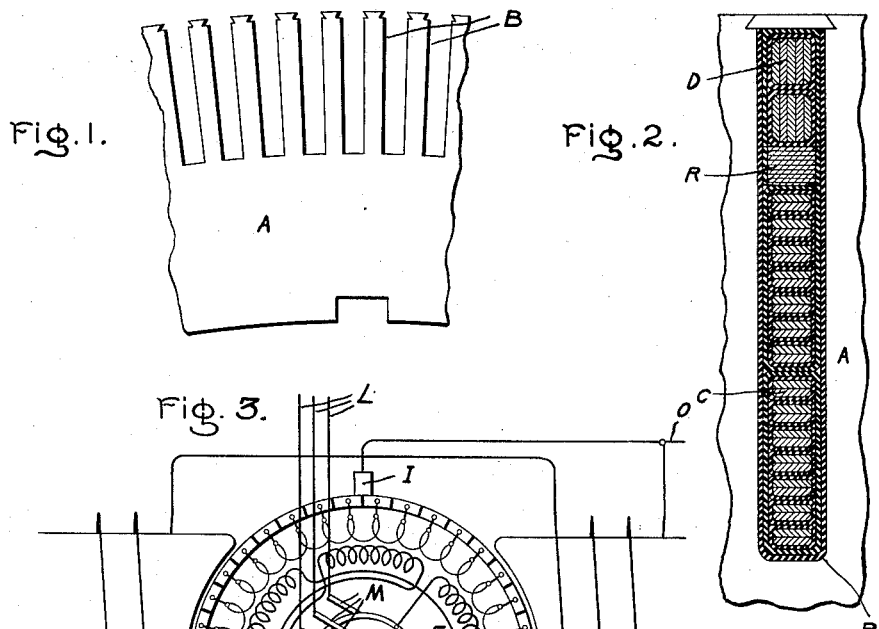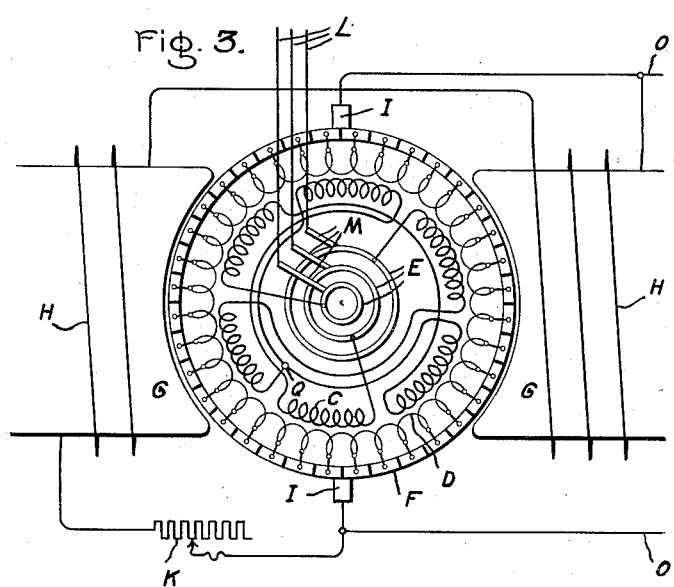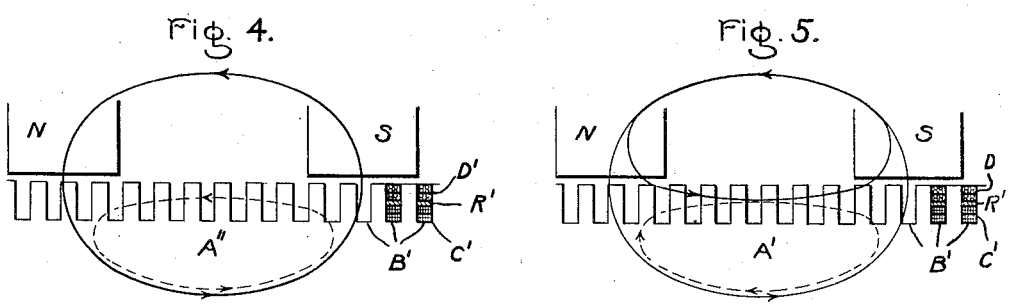

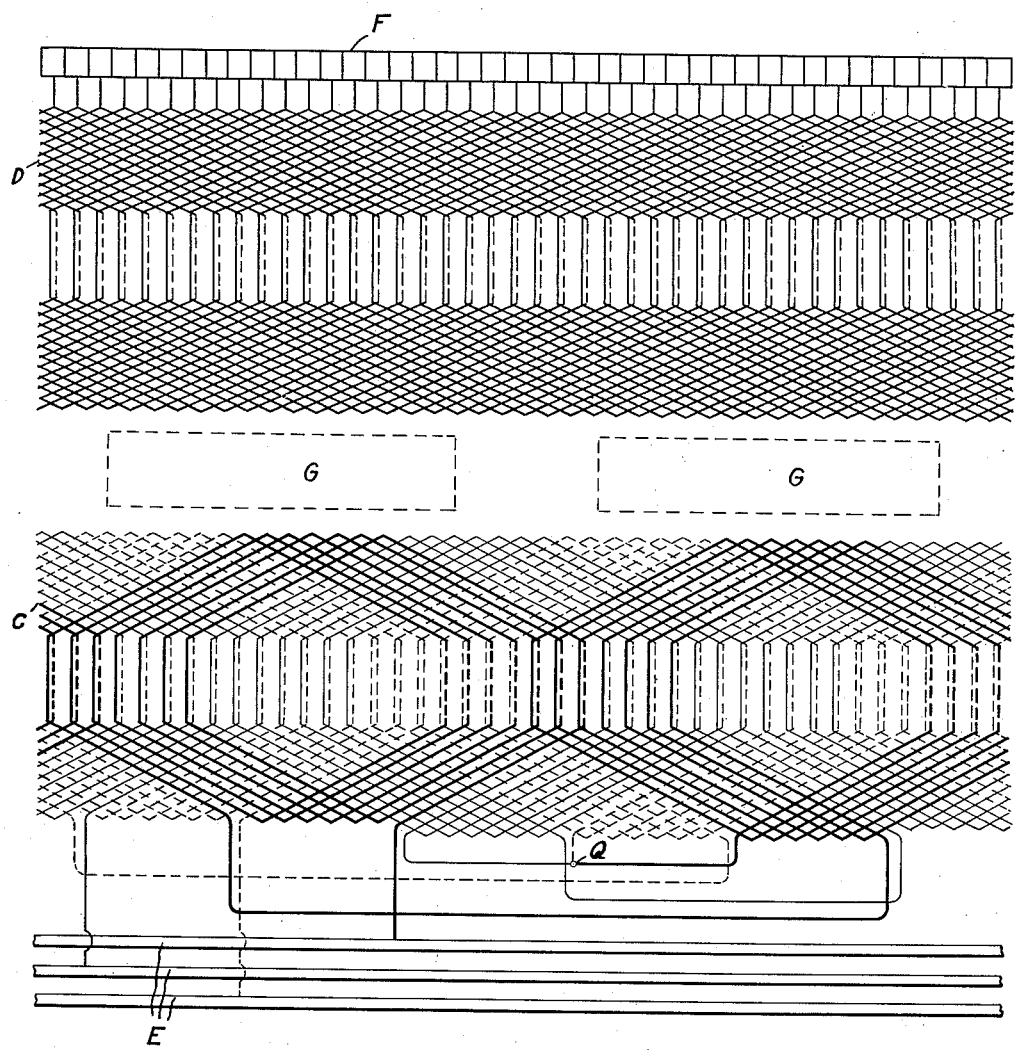

ERNST F. W. ALEXANDERSON, OF SCHENECTADY, NEW YORK, ASSIGNOR TO GENERAL ELECTRIC COMPANY, A CORPORATION OF NEW YORK.

ROTARY TRANSFORMING APPARATUS.

1,420,398.

Specification of Letters Patent. Patented June 20, 1922.

Application filed August 23, 1919. Serial No. 319,414.

*To all whom it may concern:*

Be it known that I, ERNST F. W. ALEXANDERSON, a citizen of the United States, residing at Schenectady, in the county of Schenectady, State of New York, have invented certain new and useful Improvements in Rotary Transforming Apparatus, of which the following is a specification.

My invention relates to rotary transforming apparatus for transforming alternating current to direct current, or vice versa. For the purpose of effecting this transformation, a rotary converter has been extensively used. The rotary converter possesses one inherent defect however, namely, that its ratio of transformation, that is, the ratio between the electromotive forces of the alternating current and direct current sides, is fixed, and further this ratio is necessarily comparatively close to unity, that is, the direct current voltage is substantially equal to the diameter of the circle enclosing the phase diagram of the alternating current voltages. It is necessary, therefore, in order to get the advantages of high voltage alternating current transmission, to use, in connection with rotary converters, stationary transformers between the alternating current transmission lines and the rotary converter. In order to obviate the use of transformers in a system in which it is desired to obtain direct current of substantially low potential from a high voltage alternating current transmission line it has heretofore been proposed to use a rotary transformer or dynamotor having independent alternating current and direct current armature windings with a common field. Such a machine if constructed along ordinary lines is certain to have characteristics such that excessive sparkings will occur at the direct current brushes and, as far as I am aware, no machine of this type has ever been used commercially.

My present invention in one aspect relates to such a dynamotor in which undesirable sparking is obviated.

In order to vary the direct current voltage of a rotary converter it is necessary to use some auxiliary device such as an induction regulator, a reactance, or a booster, connected in series with the alternating current side of the converter. In accordance with another aspect of my invention, I aim to do away with such auxiliary apparatus and to provide a dynamotor and a method of regulating the same, whereby I can transform a high potential alternating current to a direct current of any desired voltage, and at the same time regulate the direct current voltage over a very wide range.

The various features of novelty which characterize my invention are set forth with particularity in the claims annexed to and forming a part of this specification. For a better understanding of my invention, reference may be had to the following description taken in connection with the accompanying drawings, in which Fig. 1 is a fragmentary view of the armature core of my dynamotor; Fig. 2 is a cross sectional view of an armature slot of my dynamotor, showing the position of the windings therein; Fig. 3 is a diagram of connections; Figs. 4 and 5 are explanatory diagrams; and Fig. 6 is a diagram of the windings of my machine.

Referring to the drawings, I have shown a dynamotor, the armature of which has a core A provided with narrow, deep slots B in the bottom of which an alternating current armature winding C is placed and in the top of which there is a direct current armature winding D. Each of the armature slots contains coils of both of said windings. The alternating current winding is connected to suitable collector rings E. The direct current armature winding is connected to the segments of a commutator F. The armature revolves between field poles G, which are shown as being energized by a shunt field winding H connected across the direct current brushes I of the dynamotor. In series with the field winding H is a variable resistance K, whereby the current flowing through the field winding can be readily varied. Alternating current from a suitable source is supplied to the collector rings E through alternating current leads L and collector ring brushes M. Direct current is supplied to direct current mains O by the direct current armature winding D through the brushes I bearing on the commutator F.

The alternating current winding C is a many turn winding producing a resultant magneto-motive force of a number of phases greater than the number of collector rings and preferably has a fractional pitch. The reasons and purposes for this will be hereafter explained. The direct current armature winding D has a small number of turns in comparison with the alternating current winding and is of substantially full pitch.

In the diagram of Fig. 6 there is shown one form of my winding for a two-pole machine. This winding, however, can be applied to a machine of any number of poles by the well known method of duplicating the winding for each pair of poles. In other words, if this winding were to be applied to a six-pole machine instead of a two-pole machine, there would be three times as many slots as shown in this figure and the winding shown would be reproduced three times. I have shown in this diagram forty-two slots, the upper winding being the direct current winding in the top of the slots and being substantially a full pitch winding. The upper coils of this winding are shown to the right and the lower coils to the left in each slot. Tracing this winding, it will be noted that the upper coil in slot 2 is connected to the bottom coil of this winding in slot 22, then from the lower coil of slot 22 to the upper coil of slot 1, etc. This direct current winding is a continuous drum winding connected in the usual way to the commutator 6.

The alternating current winding 3 in the bottoms of the slots is a fractional pitch six-phase winding. The coils of two of the phases are shown in heavy black lines, the coils of two of the other phases are shown in light lines, and the other two phases are shown in dotted lines. The coils of each pair of phases are connected together in series, the coils of one phase of each pair being reversed with respect to the other. One terminal of each pair of phases is connected to the Y-point Q, and the other terminal of each pair of phases is connected to one of the collector rings. From this it will be seen that although the winding illustrated is a six-phase winding, it requires only three collector rings. The upper coils of this winding are shown to the right and the lower coils to the left in each slot. As stated above, the pitch of this winding is a fractional one, and it will be noted that the upper coil of this winding in slot 1 is connected to the bottom coil in slot 18 then to the top coil of this winding in slot 2, etc. Thus it will be seen that the pitch of this winding is about 81 per cent. Such a fractional pitch alternating current winding will give a resultant magneto-motive force corresponding to a polygon of twelve sides.

By placing coils of both the alternating current and the direct current windings in each of the slots, the magnetic reaction of my machine will be the same as in a standard rotary converter. However, due to the fact that over every 180 electrical degrees of the armature, the alternating current goes through a sine function whereas the direct current is constant, the resultant armature reaction is a pulsating one. This pulsating armature reaction at the point of commutation in a single armature rotary transformer, such as a rotary converter or dynamotor, affects the commutation, producing sparking at the direct current brushes, because commutation takes place in a pulsating field. By increasing the number of phases of the alternating current winding, this resultant armature reaction is materially reduced. In my dynamotor, not only have I increased the number of phases but by making the alternating current winding a fractional pitch winding, the resultant armature reaction is that of a many phase winding, and in the particular winding shown, is that of a twelve phase winding, and is therefore a close approach to a continuous rotating field. I have, therefore, in effect materially increased the number of phases of the alternating current winding without increasing the number of collector rings.

The pitch of the alternating current winding is independent of the pitch of the direct current winding. In order that the machine commutate well, the direct current winding must, however, be a substantially full pitch winding. If, therefore, with a given dynamotor built in accordance with my invention it is desired to develop a dynamotor having a slightly different ratio of alternating current voltage to direct current voltage, the pitch of the alternating current winding may be changed and thereby the voltage ratio changed. For example, if the pitch of the alternating current windings is shortened, the field of the dynamotor must be strengthened in order that the alternating current winding develop its normal counter electromotive force. This strengthening of the field will increase the voltage of the direct current winding. Thus, shortening the pitch of the alternating current winding, increases the direct current voltage of my machine with the same alternating current voltage applied to the alternating current winding, and lengthening the pitch of the alternating current winding decreases the direct current voltage of the machine with the same alternating current voltage applied to the alternating current winding.

In order to obtain a wide range of regulation of the direct current voltage, I vary the excitation supplied the field winding H and thereby vary the proportion of the total flux cut by the alternating current armature winding G. I have illustrated in Figs. 1 and 2, my preferred construtcion of armature slots for accomplishing this regulation. Fig. 1 shows a portion of the armature core A of my dynamotor provided with narrow, deep slots B, before the windings are placed therein. Fig. 2 shows one of these slots with the windings in place. The alternating current armature winding C is placed in the bottom of the slots, each turn of which is shown as being thoroughly insulated from adjacent turns and from the core A. The direct current winding is placed in the top of the slots. In each slot, between the alternating current and direct current windings, is placed a spacer R of magnetic material, such as iron or steel. If now, the excitation of the dynamotor is changed, the portion of the flux that is shunted through the spacers is varied, thereby changing the proportion of the total flux cut by the alternating current winding C. Since this shunting of the flux does not affect the portion of the flux cut by the direct current winding D, the direct current voltage is capable of being varied over a very wide range. In practice, I have found it possible with this construction, to vary the direct current voltage from 240 volts to 300 volts with a constant alternating current voltage of 6600 applied to the terminals of the alternating current winding.

A fuller explanation of the operation of the voltage regulation of my dynamotor, may be had by reference to the explanatory diagrams of Figs. 4 and 5. In these figures, A' represents a development of an armature provided with deep narrow slots B'. In the bottom of these slots is placed the alternating current armature winding C', and in the top of these slots is placed the direct current armature winding D', with a magnetic spacer R' between them. N and S represent the north and south poles respectively of the dynamotor.

The alternating current end of my dynamotor operates in a similar way to that of a synchronous motor. When a synchronous motor is under excited, a lagging current is drawn from the alternating current system, which current tends to strengthen the motor field so that the counter electromotive force generated in the winding is made equal to that of the system. Similarly if the machine is over excited the current drawn from the supply system will be leading, and will thus demagnetize the motor field sufficiently to make the generated electromotive force equal to that of the system. With a lagging current flowing through the alternating current armature winding, the flux set up thereby will be in a direction to aid the field flux. This is shown in Fig. 4, in which the solid line represents the path of the field flux and the dotted line the path of the armature flux. It will be apparent, therefore, that very little of the field flux is shunted through the space between the two windings and that practically all of the field flux cut by the direct current armature winding is also cut by the alternating current armature winding so that the voltage generated in each turn of each winding is the same. When, however, the alternating current flowing through the alternating current armature winding is leading, the flux set up by the current in this winding tends to oppose the field flux, that is, the reluctance of the path through the armature core is increased and therefore a portion of the total flux will be shunted between the two armature windings. This is shown in Fig. 5 in which the solid lines represent the paths of the field flux and the dotted line the path of the armature flux. If te space between the windings is filled with a material having a low reluctance, the amount of flux shunted therethrough can be made an appreciable amount of the total field flux. I therefore prefer to use spacers of magnetic material between the two windings so that the reluctance of this shunt circuit will be low. This shunting of the flux causes the direct current armature winding to cut more of the field flux than the alternating current armature winding and therefore a higher voltage is generated in the direct current armature winding. Since the alternating current voltage applied to the alternating current armature winding remains constant, the counter electromotive force generated by this winding, which is substantially equal to the alternating current voltage applied (except for the resistance drop in the winding), is the same for all field excitations. Therefore, it is apparent that by varying the field current, thereby varying the phase angle between the voltage and current applied to the alternating current winding, the voltage generated by the direct current winding can be varied, and that the more the current leads the voltage the greater is the direct current voltage.

I do not wish to be understood that my invention is limited to a spacer made of magnetic material as I have found that if a large air-gap is left between the two windings, I am able, by varying the excitation of the field winding, to cause the direct current voltage to be varied over quite a wide range. It is preferable, however, to use spacers made of material having low reluctance so as not to offer too much resistance to the passage of magnetic flux therethrough.

The same effect as with magnetic spacers may be obtained by making the portion of the slot between the two windings narrow by corresponding overhangs from the adjacent teeth.

Although I have described the alternating current winding as a six-phase winding having a pitch of 81 per cent, I desire it to be understood that the alternating current winding may be a multi-phase winding of any number of phases and of a fractional pitch of any desired percentage.

It is apparent that I have produced a machine whereby a high voltage alternating current can be transformed to a low voltage direct current, and in which the direct current voltage can be varied over a wide range without using additional apparatus.

What I claim as new and desire to secure by Letters Patent of the United States, is:—

1. In a dynamotor, an armature having a core provided with slots, a commutator, collector rings, an alternating current armature winding connected to said collector rings, said winding producing a resultant magneto-motive force of a greater number of phases than the number of collector rings, and a direct current armature winding connected to said commutator, each of said slots containing coils of said alternating current winding at the bottom thereof and coils of said direct current winding at the top thereof.

2. In a dynamotor, an armature having a core provided with slots, a commutator, collector rings, a fractional pitch alternating current armature winding connected to said collector rings, said windings producing a resultant magneto-motive force of a greater number of phases than the number of collector rings, and a direct current armature winding connected to said commutator, each of said slots containing coils of said alternating current winding at the bottom thereof and coils of said direct current winding at the top thereof.

3. In a dynamotor, an armature having a core provided with slots, a commutator, collector rings, fractional pitch alternating current armature winding connected to said collector rings, said winding producing a resultant magneto-motive force of a greater number of phases than the number of collector rings, and a direct current armature winding having substantially full pitch, each of said slots containing coils of said alternating current armature winding at the bottom thereof and coils of said direct current armature winding at the top thereof.

4. In a dynamotor, an armature having a core provided with slots, three collector rings, a commutator, a six-phase alternating current armature winding connected to said collector rings, and a direct current armature winding connected to said commutator, each of said slots containing coils of said alternating current armature winding at the bottom thereof and coils of said direct current armature winding at the top thereof.

5. In a dynamotor, an armature having a core provided with slots, a six-phase fractional pitch alernating current armature winding connected to the alternating current terminals of the device, and a direct current armature winding connected to the direct current terminals of the device, each of said slots containing coils of said alternating current armature winding at the bottom thereof and coils of said direct current armature winding at the top thereof.

6. In a dynamotor, an armature having a core provided with slots, a six-phase fractional pitch alternating current armature winding connected to the alternating current terminals of the device, and a direct current armature winding of substantially full pitch connected to the direct current terminals of the device, each of said slots containing coils of said alternating current armature winding at the bottom thereof and coils of said direct current armature winding at the top thereof.

7. In a dynamotor, an armature having a core provided with slots, three collector rings, a commutator, a six-phase fractional pitch alternating current armature winding connected to said collector rings, and a direct current armature winding connected to said commutator, each of said slots containing coils of said alternating current armature winding at the bottom thereof and coils of said direct current armature winding at the top thereof.

8. In a dynamotor, an armature having a core provided with slots, three collector rings, a commutator, a six-phase fractional pitch alternating current armature winding connected to said collector rings, and a direct current armature winding of substantially full pitch connected to said commutator, each of said slots containing coils of said alternating current armature winding at the bottom thereof and coils of said direct current armature winding at the top thereof.

9. In a dynamotor, an armature having a core provided with slots, three collector rings, a commutator, a six-phase alternating current armature winding of substantially 83 per cent pitch connected to said collector rings, and a direct current armature winding of substantially full pitch connected to said commutator, each of said slots containing coils of said alternating current armature winding at the bottom thereof and coils of said direct current armature winding at the top thereof.

10. In a dynamotor, for transforming alternating current to direct current, the combination of an armature having a core provided with slots, an alternating current armature winding connected to the alternating current terminals of the device, a direct current armature winding connected to the direct current terminals of the device, each of said slots containing coils of said alternating current armature winding at the bottom thereof and coils of said direct current armature winding at the top thereof, a field winding for producing flux which is cut by both of said armature windings, and means for varying the excitation supplied said field winding to vary the proportion of the total flux cut by said alternating current armature winding so as to vary the direct current voltage of said machine.

11. In a dynamotor for transforming alternating current to direct current, the combination of an armature having a core provided with slots, an alternating current armature winding connected to the alternating current terminals of the device, a direct current armature winding connected to the direct current terminals of the device, each of said slots containing coils of said alternating current armature winding at the bottom thereof and coils of said direct current armature winding at the top thereof, a field winding for producing flux which is cut by both of said armature windings, means located between said armature windings providing a path of low reluctance for said flux, and means for varying the excitation supplied said field winding to vary the proportion of the total flux cut by said alternating current armature winding so as to vary the direct current voltage of said machine.

12. In a dynamotor for transforming alternating current to direct current, the combination of an armature winding connected to the alternating current terminals of the device, an armature winding connected to the direct current terminals of the device, a field winding for producing flux which is cut by both of said armature windings, means located between said armature windings providing a path of low reluctance for said flux, and means for varying the excitation supplied said field winding to vary the proportion of the total flux cut by said alternating current armature winding so as to vary the direct current voltage of said machine.

13. In a dynamotor for transforming alternating current to direct current, the combination of an armature winding connected to the alternating current terminals of the device, an armature winding connected to the direct current terminals of the device, a field winding for producing flux, a magnetic circuit for said flux arranged so that a substantial portion of said flux cut by one armature winding is not cut by the other armature winding, and means for varying this portion of said flux so as to vary the direct current voltage.

14. In a dynamotor for transforming alternating current to direct current, the combination of an armature winding connected to the alternating current terminals of the device, an armature winding connected to the direct current terminals of the device, a field winding for producing flux, a magnetic circuit for said flux arranged so that a substantial portion of said flux cut by the direct current armature winding is not cut by the alternating current armature winding, and means for varying this portion of the flux so as to vary the direct current voltage.

15. In a dynamotor for transforming alternating current to direct current, the combination of an armature winding connected to the alternating current terminals of the device, an armature winding connected to the direct current terminals of the device, a field winding for producing flux, a magnetic circuit for said flux including magnetic spacers between said armature windings, and means for varying the proportion of the total flux passing through said spacers so as to vary the direct current voltage of the machine.

16. In a dynamotor for transforming alternating current to direct current, the combination of a field winding and an armature core having a plurality of slots, an armature winding in the bottom of said slots and connected to the alternating current terminals of the device, an armature winding in the top of said slots and connected to the direct current terminals of the machine, and magnetic spacers between said armature windings in said slots and arranged to form a magnetic circuit for a portion of the flux produced by said field winding.

17. In a dynamotor for transforming alternating current to direct current, the combination of a field winding and an armature core having a plurality of slots, an armature winding in the bottom of said slots and connected to the alternating current terminals of the device, an armature winding in the top of said slots and connected to the direct current terminals of the machine, magnetic spacers between said armature windings in said slots and arranged to form a magnetic circuit for a portion of the field flux produced by said field winding, and means for varying the proportion of the total flux through said spacers.

18. The method of varying the voltage ratio of transformation of a dynamotor having independent alternating current and direct current armature windings which consists in producing a flux which is cut by both of said armature windings, and in varying the proportion of the total flux so produced which is cut by the alternating current armature winding so as to vary the direct current voltage of the machine.

19. The method of varying the voltage ratio of transformation of a dynamotor having independent alternating current and direct current armature windings and a field winding adapted to produce a flux which is cut by both of said armature windings, which consists in varying the current flowing in said field winding so as to vary the proportion of the total flux cut by the alternating current armature winding to vary the direct current voltage of the machine.

20. The method of varying the voltage ratio of transformation of a dynamotor having independent alternating current and direct current armature windings and a field winding adapted to produce a flux which is cut by both of said armature windings, which consists in varying the current flowing in said field winding so as to vary the reluctance of a portion of the magnetic circuit of said flux so that the direct current armature winding cuts a different amount of field flux than the alternating current armature winding and thereby vary the direct current voltage of the machine.

In witness whereof, I have hereunto set my hand this 23rd day of August, 1919.

ERNST F. W. ALEXANDERSON.